United States Patent
Sohn et al.

(10) Patent No.: US 9,871,806 B2
(45) Date of Patent: Jan. 16, 2018

(54) APPARATUS AND METHOD OF DISPLAYING NETWORK SECURITY SITUATION

(71) Applicant: Electronics and Telecommunications Research Institute, Daejeon (KR)

(72) Inventors: Seon Gyoung Sohn, Daejeon (KR); Young Jun Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 57 days.

(21) Appl. No.: 14/729,709

(22) Filed: Jun. 3, 2015

(65) Prior Publication Data

US 2015/0350242 A1 Dec. 3, 2015

(30) Foreign Application Priority Data

Jun. 3, 2014 (KR) .................. 10-2014-0067734

(51) Int. Cl.
*H04L 29/06* (2006.01)

(52) U.S. Cl.
CPC .................. *H04L 63/1408* (2013.01)

(58) Field of Classification Search
CPC ..... H04L 63/1408; H04L 12/24; H04L 12/26; H04L 63/1441; H04L 63/20
See application file for complete search history.

(56) References Cited

U.S. PATENT DOCUMENTS

| 8,014,310 B2 | 9/2011 | Chang et al. |
| 8,019,865 B2 | 9/2011 | Chang et al. |
| 2010/0257267 A1* | 10/2010 | Sohn ............ H04L 41/28 709/224 |

FOREIGN PATENT DOCUMENTS

| KR | 10-2008-0050919 A1 | 6/2008 |
| KR | 10-2009-0030880 A | 3/2009 |
| KR | 10-2009-0043113 A | 5/2009 |
| KR | 10-1380768 B1 | 4/2014 |

OTHER PUBLICATIONS

Daisuke Inoue (Daedalus: Darknet Monitoring-based Alert System and its Practical use in Society, NICT news, No. 438, Mar. 2014, pp. 1-2).*

Yin, X., et al., "VisFlowConnect: NetFlow Visualizations of Link Relationships for Security Situational Awareness," VizSEC 2004, Oct. 2014, pp. 26-34.

* cited by examiner

Primary Examiner — Oleg Korsak
(74) Attorney, Agent, or Firm — Nelson Mullins Riley & Scarborough LLP; Anthony A. Laurentano (57) ABSTRACT

An apparatus and method of displaying a network security situation is provided. The apparatus includes an extraction unit configured to classify a characteristic factor including IP addresses of a transmission node and a reception node from a traffic flow, a network visualization unit configured to generate a domain circle visualizing each of a transmission domain and a reception domain as a circle shape by mapping the IP addresses of the transmission node and the reception node to points on circumference as one to one, arrange the generated domain circle on an axis, and visualize each of a transmission network area and a reception network area as a sphere shape, a session construction unit configured to a session of the visualized transmission network area and reception network visually, and a display unit configured to display the session which is visually constructed.

5 Claims, 8 Drawing Sheets

APPARATUS AND METHOD OF DISPLAYING NETWORK SECURITY SITUATION

CROSS-REFERENCE TO RELATED APPLICATION

This application claims priority to and the benefit of Korean Patent Application No. 10-2014-0067734, filed on Jun. 3, 2014, the disclosure of which is incorporated herein by reference in its entirety.

BACKGROUND

1. Field of the Invention

The present invention relates to an apparatus and method of displaying a network security situation, and more particularly, to an apparatus and method of displaying a security event of a network.

2. Discussion of Related Art

Security visualization related to network communication is a procedure of representing a log record, an attack detection event, etc, by visual means. Generally, a security situation can be analyzed more effectively by displaying information as graphics using diagrams or pictures rather than texts. Accordingly, the security visualization is used for the purpose of supporting monitoring of a security event and traffic, management of a security apparatus, security control, etc.

Traffic data generated in a conventional network apparatus and a warning message generated in a security apparatus are security events of a text type. Since it takes a long time to analyze so many messages of the text type, it is difficult to recognize an important attack event within a short time.

To solve the problem, various technologies for monitoring the security situation of a network have been proposed, and recently, technology of visualizing network traffic in which a manager can actually recognize network attack situation information through combination with event visualization technology is being proposed.

The network security event visualization technology is technology in which a manager intuitively recognizes the network security situation such as detection of a network attack, pattern analysis of unknown attacks, detection of a network abnormal status, etc. by visualizing a vast amount of events in real time. A large amount of information related to the security can be easily and exactly transmitted to a network manager using the network security event visualization technology. Further, unknown attacks and zero-day attacks can be recognized.

Technology titled "a three-dimensional security situation display apparatus and method of representing a security event using a protocol cube and an internet protocol (IP) address map" is disclosed in Korea Patent Publication No. 10-2008-0050919. The protocol cube represents various protocols and port information, and the IP address map represents IP addresses of source and destination. The disclosed security situation display apparatus and method is effective for recognizing the security situation of entire network quickly and intuitively by monitoring an entire IP address space.

However, the network traffic visualization technology targeting the entire network is difficult to recognize the event intuitively since the traffic data is displayed intensively only on a portion of the IP address space when applying to a single domain or a multi domain.

SUMMARY OF THE INVENTION

The present invention is directed to an apparatus and method of displaying a network security situation capable of monitoring the network security situation of a single domain and a multi domain, and recognizing a security situation of each apparatus and each session through a traffic event in the monitored single domain and the multi domain.

According to one aspect of the present invention, there is provided an apparatus for displaying a network security situation, including: an extraction unit configured to classify a characteristic factor including a plurality of transmission node addresses and a plurality of reception node addresses according to each of a plurality of domains; a network visualization unit configured to generate a plurality of transmission source domain circles and a plurality of reception source domain circles by mapping corresponding node addresses on a circumference of one circle representing each of the plurality of domains, and generate a transmission source network sphere and a reception source network sphere visualized as a sphere shape by arranging the plurality of transmission source domain circles and the plurality of reception source domain circles which are generated on one axis; a session construction unit configured to construct a session between a transmission node address on the transmission source network sphere and a reception node address on the reception source network sphere visually; and a display unit configured to display the session which is constructed visually.

One of the domain circles may represent one C-class network. The network visualization unit may generate one transmission source network sphere by arranging a plurality of domain circles capable of being represented as the C-class network on one axis, and in the same manner, visualize so as to generate one reception source network sphere.

The network visualization unit may arrange the transmission source network sphere and the reception source network sphere side by side, or visualize so as to arrange the transmission source network sphere in the reception source network area.

The characteristic factor may further include a plurality of protocols and a plurality of port numbers.

The network visualization unit may generate a plurality of transmission source protocol circles and a plurality of reception source protocol circles by mapping the plurality of port numbers on the circumference of one circle representing each of the plurality of protocols using the characteristic factor.

The network visualization unit may visualize the plurality of transmission source protocol circles and the plurality of reception source protocol circles which are generated in a shape of surrounding the transmission source network sphere and the reception source network sphere, respectively, when the transmission source network sphere is arranged to be included in the reception source network sphere.

The network visualization unit may arrange the plurality of transmission source protocol circles and the plurality of reception source protocol circles which are generated side by side, when the transmission source network sphere and the reception source network source are arranged side by side.

The session construction unit may construct the session visually by changing sizes or colors of points on a circumference to which a corresponding node address is mapped according to the number of sessions.

According to another aspect of the present invention, there is provided a method of displaying a network security situation, including: extracting a characteristic factor including a plurality of transmission node addresses and a plurality of reception node addresses from a traffic flow; mapping the plurality of transmission node addresses and the plurality of reception node addresses to a transmission source network sphere and a reception source network sphere, respectively; mapping transmission/reception protocol information and port information to a transmission source protocol circle and a reception source protocol circle, respectively; constructing a session between a transmission node address on the transmission source network sphere and a reception node address on the reception source network sphere visually; and displaying the session which is constructed visually.

The displaying of the session which is constructed visually may include: constructing a session between at least one transmission source node and at least one reception source node selected by the user visually, or constructing a session between at least one of the transmission source node, a protocol and a port, and at least one of the reception source node, a protocol, and a port visually.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The present invention provides an apparatus for displaying a network security situation capable of monitoring traffic events of a single domain and a multi domain intuitively by visualizing one domain as one circle and visualizing a network area as a sphere shape.

Hereinafter, exemplary embodiments of the present invention will be described in detail below with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims. Meanwhile, the terminology used herein to describe exemplary embodiments of the invention is not intended to limit the scope of the invention. The articles "a," "an," and "the" are singular in that they have a single referent, however the use of the singular form in the present document should not preclude the presence of more than one referent.

Figure 1:
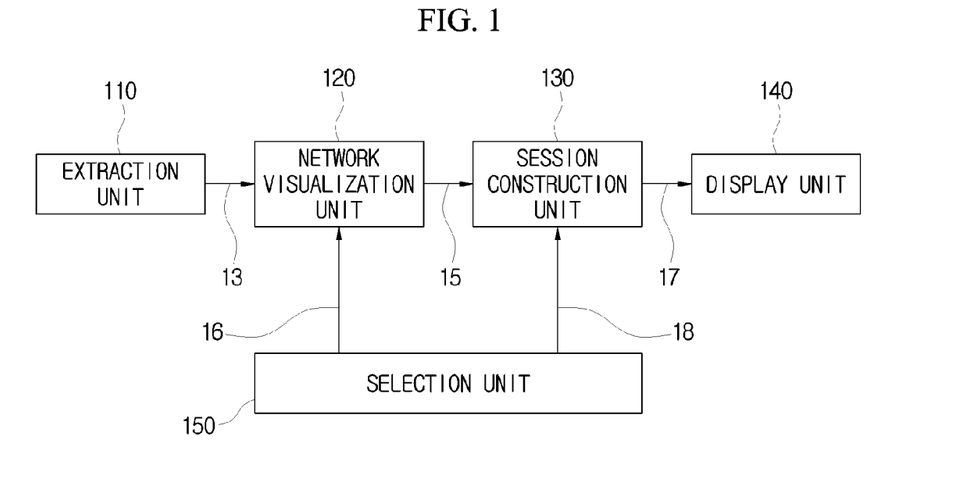
FIG. 1 is a block diagram illustrating an apparatus for displaying a network security situation according to an embodiment of the present invention.

FIG. 1 is a block diagram illustrating an apparatus for displaying a network security situation according to an embodiment of the present invention.

Referring to FIG. 1, an apparatus 100 for displaying a network security situation capable of recognizing the security situation of a network intuitively may include an extraction unit 110, a network visualization unit 120, a session construction unit 130, a display unit 140, and a selection unit 150.

The extraction unit 110 may extract a characteristic factor 13 from a traffic flow. The characteristic factor 13 may include an internet protocol (IP) address of a transmission node, an IP address of a reception node, protocol information, a transmission source port number, and a reception source port number, etc., and the extracted characteristic factor 13 may be transmitted to the network visualization unit 120.

The network visualization unit 120 may generate a plurality of transmission source domain circles by mapping the IP address of the transmission node included in the transmitted characteristic factor 13 to a point on a circumference, and generate a plurality of reception source domain circles by mapping the IP address of the reception node to the point on the circumference. At this time, the generated one circle may define one domain. For example, a group of IP addresses from an IP address aaa.bbb.ccc.000 to an IP address aaa.bbb.ccc.255 may be one domain. When assuming the IP addresses of four octets which are represented as aaa.bbb.ccc.000 to aaa.bbb.ccc.255, a portion consisting of fixed numbers of a first octet to a third octet may be defined as a domain. That is, the domain with respect to the above IP addresses may be defined as aaa.bbb.ccc.xxx.

The network visualization unit 120 may arrange the plurality of transmission source domain circles and the plurality of reception source domain circles which are generated, respectively, on an axis, and generate a transmission source network sphere representing a transmission source network area and a reception source network sphere representing a reception source network area. Accordingly, the IP addresses of the transmission node and the IP addresses of the reception node may be visualized on surfaces of the transmission source network sphere and the reception source network sphere, respectively.

The session construction unit 130 may visually construct a session between the transmission node on the transmission source network sphere and the reception node on the reception source network sphere visualized by the network visualization unit 120 using information of nodes and network information 15 needed for constructing a session.

The display unit 140 may receive session information 17 between the transmission node and the reception node which are constructed visually, and display the received session information 17.

The selection unit 150 may receive at least one domain or a network area in which a user desires to monitor (or a user selects). Information 16 with respect to the at least one domain or the network area may be transmitted to the network visualization unit 120. Accordingly, the network visualization unit 120 may selectively visualize the domain circle and the network sphere corresponding to one domain and at least one network area selected by the user among the plurality of domains and network spheres which are generated.

The domain circle and the network sphere which are selectively visualized may be transmitted to the session construction unit 130, and selectively construct the sessions between the transmission node and the reception node in at least one domain and at least one network area in which the user desires to monitor, and the display unit 140 may display the sessions which are selectively constructed.

As such, the apparatus 100 for displaying the network security situation according to an embodiment of the present invention can intuitively recognize the security situation in a single domain or a multi domain in which the user desires to monitor by three-dimensionally displaying the security situation information on the domains visualized as the circle shape and on the network area visualized as the sphere shape.

Figure 2:
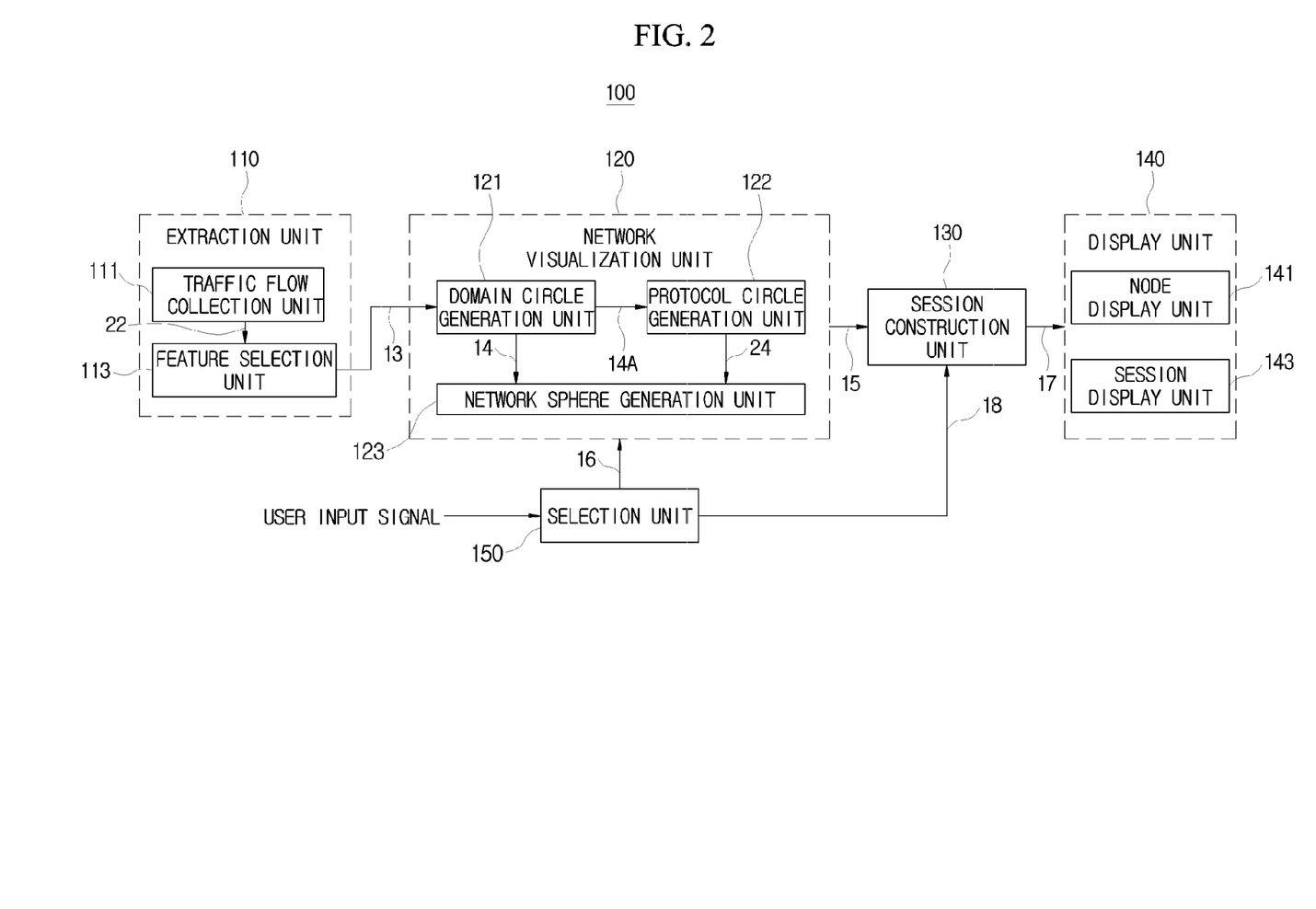
FIG. 2 is a detailed block diagram illustrating the apparatus for displaying the network security situation shown in FIG. 1.

FIG. 2 is a detailed block diagram illustrating the apparatus for displaying the network security situation shown in FIG. 1.

Referring to FIG. 2, the extraction unit 110 may include a traffic flow collection unit 111, and a feature selection unit 113.

The traffic flow collection unit 111 may collect a traffic flow generated by a traffic flow generator, or collect traffic information in an external traffic information storage unit.

The feature selection unit 113 may extract a characteristic factor from collected traffic information, and classify the extracted characteristic factor according to a domain. Here, the characteristic factor may include protocol information, an IP address of the transmission node, a transmission port number, an IP address of a reception node, and the reception port number.

The network visualization unit 120 may include a domain circle generation unit 121, a protocol circle generation unit 122, and a network sphere generation unit 123.

The domain circle generation unit 121 may generate a transmission source domain circle mapping the IP address of the transmission node to a point on the circumference and a reception source domain circle mapping the IP address of the reception node to a point on the circumference.

Figure 4:
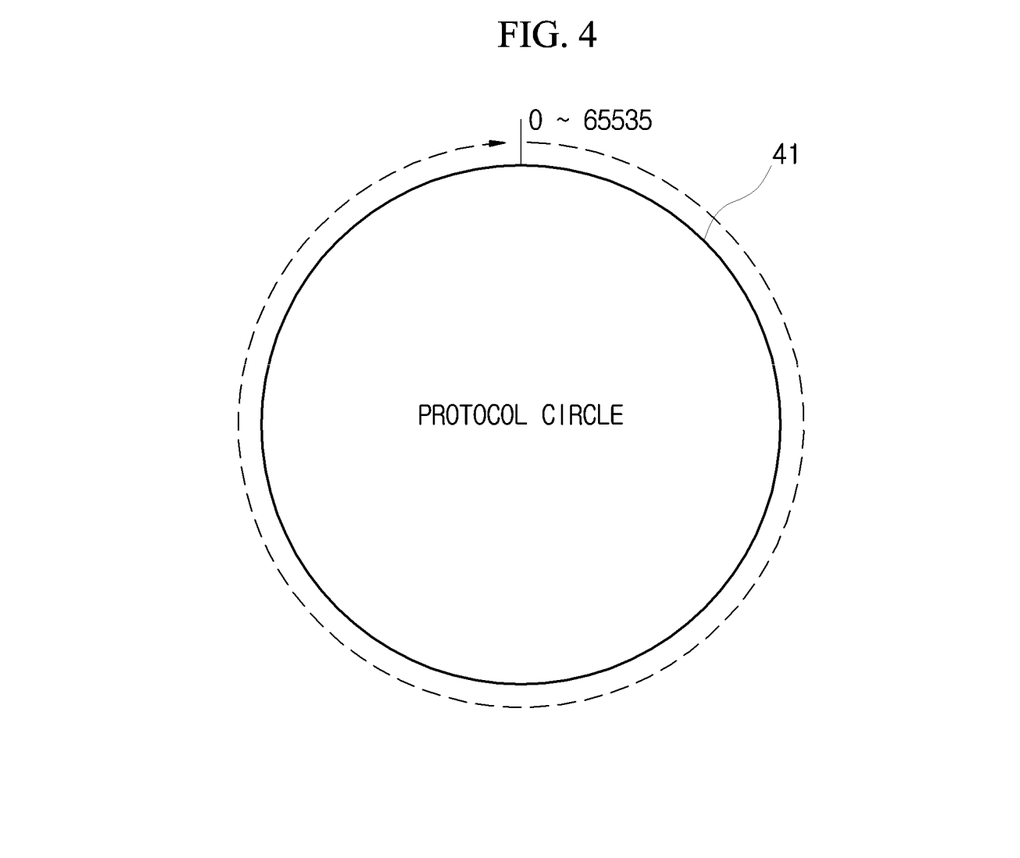
FIG. 4 is a diagram illustrating a protocol circle according to an embodiment of the present invention.

The protocol circle generation unit 122 may receive information with respect to the domain circle and characteristic factor information 20 from the domain circle generation unit 121, and generate a protocol circle as shown in FIG. 4 using the received information 20. The protocol circle generation unit 122 may arrange a plurality of port numbers 0 to 65535 along the circumference of the circle, and generate a protocol circle 41. The generated protocol circle 41 may include a transmission source protocol circle mapping the port number of the transmission protocol to one point on the circumference as one to one, and a reception source protocol circle mapping the port number of the reception protocol to one point on the circumference as one to one.

The network sphere generation unit 123 may receive information 14 with respect to the visualized domain circle and information 24 with respect to the visualized protocol circle, and generate the network sphere representing the network area. The generated network sphere may include a transmission source network sphere in which a plurality of transmission source domain circles are arranged on an axis and a reception source network sphere in which a plurality of reception source domain circles are arranged on the axis. The domain circle may represent maximum 256 nodes included in a C-class network. For example, when a domain manager monitors traffic transmitted in an entire network consisting of one C-class network, the network sphere generation unit 123 may represent the entire network area by constructing the sphere by 256×256×256 domain circles.

The session construction unit 130 may receive information with respect to the domain circle and the network sphere and information 15 with respect to the IP addresses of the transmission node and the reception node, and visually construct a session between the transmission node and the reception node. For example, the session construction unit 130 may adjust a size of a point mapped on the circumference of the domain circle according to the number of sessions, or adjust a color of a connection line of connecting the mapped points according to a specific protocol and the port number, and thus visualize the sessions.

The display unit 140 may display the network area visualized as a sphere shape and the constructed session information 17.

The selection unit 150 may selectively visualize one domain selected by the user among the plurality of domains and the network spheres which are generated, and the domain circle and the network sphere corresponding to the network area. For example, when the user desires to monitor only the session between the transmission node and the reception node included in a specific transmission source domain and a specific reception source domain, the session construction unit 130 may visualize the session between the transmission node and the reception node included in an input domain when the user inputs information with respect to the specific transmission source domain and the specific reception source domain.

Further, in another embodiment, the apparatus 100 for displaying the network security situation may receive the network area and the domain which the user desires to monitor through the selection unit 150, and visualize the network area and the domain which are received in the circle shape and the network sphere shape respectively. After this, when the domain and the network area which the user desires to construct the session in the visualized domain circle and the network sphere are received through the selection unit 150, only the session included in the received area may be visually constructed and displayed. As a result, the user may intuitively recognize the security situation in the single domain or the multi domain in which the user desires to monitor.

Hereinafter, the visualized domain circle and protocol circle according to an embodiment of the present invention will be described with reference to FIGS. 3 and 4.

Figure 3:
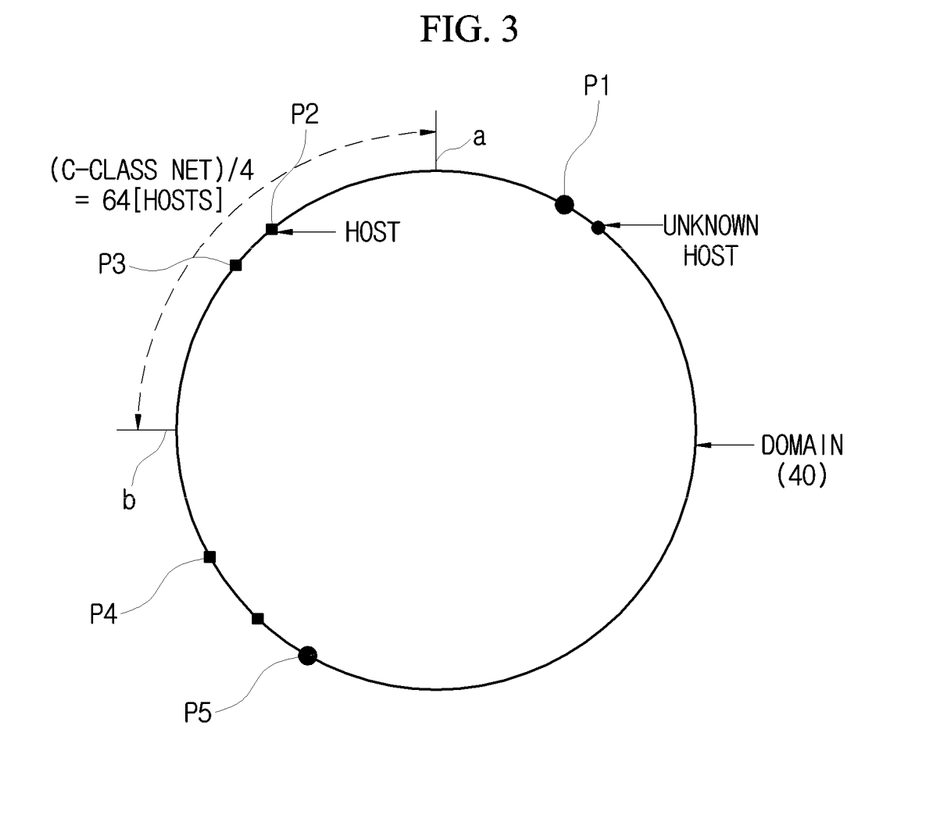
FIG. 3 is a diagram illustrating a domain circle according to an embodiment of the present invention.

FIG. 3 is a diagram illustrating a visualized domain circle according to an embodiment of the present invention.

Referring to FIG. 3, points 41, 42, 43, 44 and 45 on the circumference of a domain circle 40 generated by the domain circle generation unit 121 shown in FIG. 2 may represent IP addresses of nodes included in the domain, respectively. A plurality of nodes to which the IP addresses of aaa.bbb.ccc.000 to aaa.bbb.ccc.255 are allotted may be included in the domain.

For example, when the IP addresses of a C-class network node (a host) are mapped to the points on the circumference of the domain circle 40, 64 IP addresses corresponding to one fourth of the IP addresses of the C-class entire network node (the host) may be mapped to the points of a point a to a point b corresponding to one fourth on the circumference, respectively.

When displaying the IP addresses of aaa.bbb.ccc.200, aaa.bbb.ccc.042, aaa.bbb.ccc.120, aaa.bbb.ccc.045, and aaa.bbb.ccc.200 on the points on the circumference, the point 41 on the circumference of the domain circle 40 may be mapped to the IP address aaa.bbb.ccc.200, the point 42 on the circumference of the domain circle 40 may be mapped to the IP address aaa.bbb.ccc.042, and the point 45 on the circumference of the domain circle 40 may be mapped to aaa.bbb.ccc.120.

Similarly, the point 43 on the circumference of the domain circle 40 may be mapped to the IP address aaa.bbb.ccc.045, and the point 44 on the circumference of the domain circle 40 may be mapped to aaa.bbb.ccc.080.

Meanwhile, the points displayed on the circumference of the domain circle 40 shown in FIG. 3 may be constructed so that the points are represented as a size and a color different from each other. That is, the size and the color of the points displayed on the circumference may be represented to be changed according to the number of sessions. For example, in FIG. 3, the point 45 on the circumference mapped to the IP address aaa.bbb.ccc.120 may be represented to have a greater size than the point 44 on the circumference mapped to the IP address aaa.bbb.ccc.080. In this case, it may mean that the number of sessions of the IP address aaa.bbb.ccc.120 is greater than the number of sessions of the IP address aaa.bbb.ccc.080.

FIG. 4 is a diagram illustrating a visualized protocol circle according to an embodiment of the present invention.

Referring to FIG. 4, the protocol circle 41 generated by the protocol circle generation unit 122 shown in FIG. 2 may represent transmission protocol and reception protocol information. That is, one protocol circle may mean one protocol. For example, when the displayed protocol is a transmission control protocol (TCP), a user datagram protocol (UDP), and an Internet control message protocol (ICMP), it may be constructed so that one protocol circle represents the TCP, another protocol circle represents the UDP, and the other protocol circle represents the ICMP. Here, the port numbers of 0 to 65535 may be represented on the circumference of the protocol circle 41.

Hereinafter, a method of displaying a visualized session according to an embodiment of the present invention will be described in detail.

In this specification, one embodiment and another embodiment of displaying by directly connecting the transmission node and the reception node, and still another embodiment and yet another embodiment of arranging and displaying a protocol between the transmission node and the reception node will be described.

The method of displaying the session according to one embodiment will be described with reference to FIG. 5, the method of displaying the session according to another embodiment will be described with reference to FIG. 6, the method of displaying the session according to still another embodiment will be described with reference to FIGS. 7 and 8, and the method of displaying the session according to yet another embodiment will be described with reference to FIG. 9.

Figure 5:
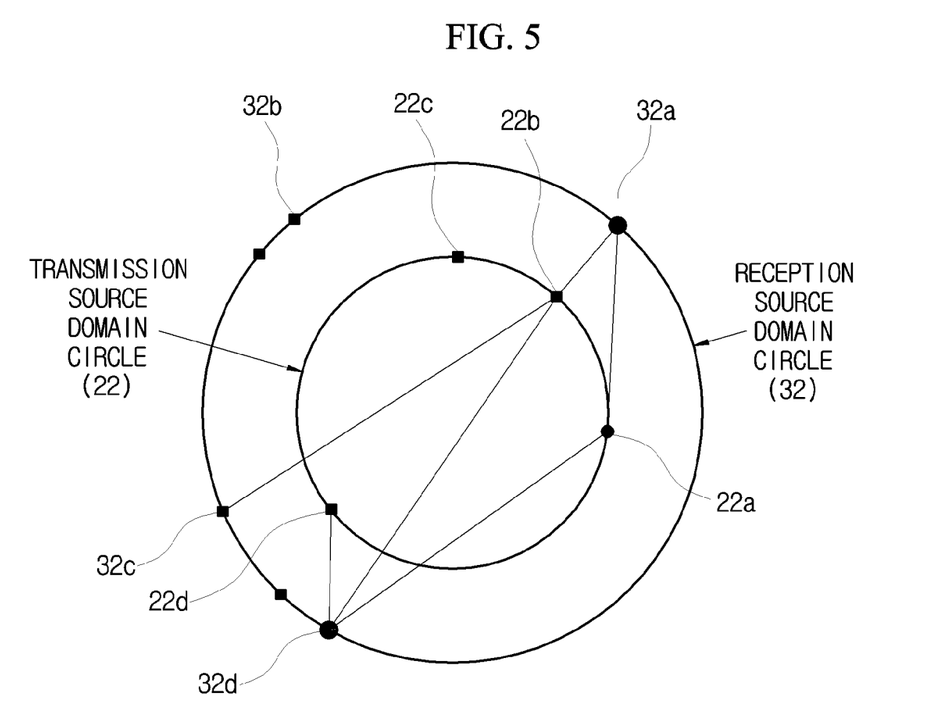
FIG. 5 is a diagram for describing a method of displaying a session between a transmission source domain circle and a reception source domain circle when a transmission source network sphere is arranged in a reception source network sphere according to one embodiment of the present invention.

FIG. 5 is a diagram for describing a method of displaying a session when a transmission source domain circle is arranged in a reception source domain circle according to one embodiment of the present invention.

As shown in FIG. 5, a transmission source domain circle 22 may be arranged in a reception source domain circle 32.

Each of the points 22a, 22b, 22c and 22d on the transmission source domain circle 22 generated by the domain circle generation unit 121 may represent each of transmission node IP addresses, and each of the points 32a, 32b, 32c and 32d on the reception source domain circle 32 may represent each of reception node IP addresses.

As shown in FIG. 5, the transmission node 22a corresponding to one point on the transmission source domain circle 22 which is arranged inside may be displayed to be connected to the reception nodes 32a and 32d corresponding to one point on the reception source domain circle 32.

The transmission node 22b corresponding to another point of the transmission source domain circle 22 may be displayed to be connected to the reception nodes 32c and 32d on the reception source domain circle 32.

The reception node 32a on the reception source domain circle 32 may be connected to each of the transmission nodes 22a and 22b, and the reception node 32c may be displayed to be connected to the transmission node 22b.

The reception node 32d may be displayed to be connected to each of the transmission nodes 22a, 22b, and 22d.

A size of the point on the circumference of the domain circle may be differently represented according to the number of sessions of each node. For example, since the reception node 32d may be connected to three transmission nodes 22a, 22b and 22d, and since the transmission node 32c is connected to one transmission node 22b, a size of the point corresponding to the reception node 32d may be greater than that of the point corresponding to the transmission node 32c.

Figure 6:
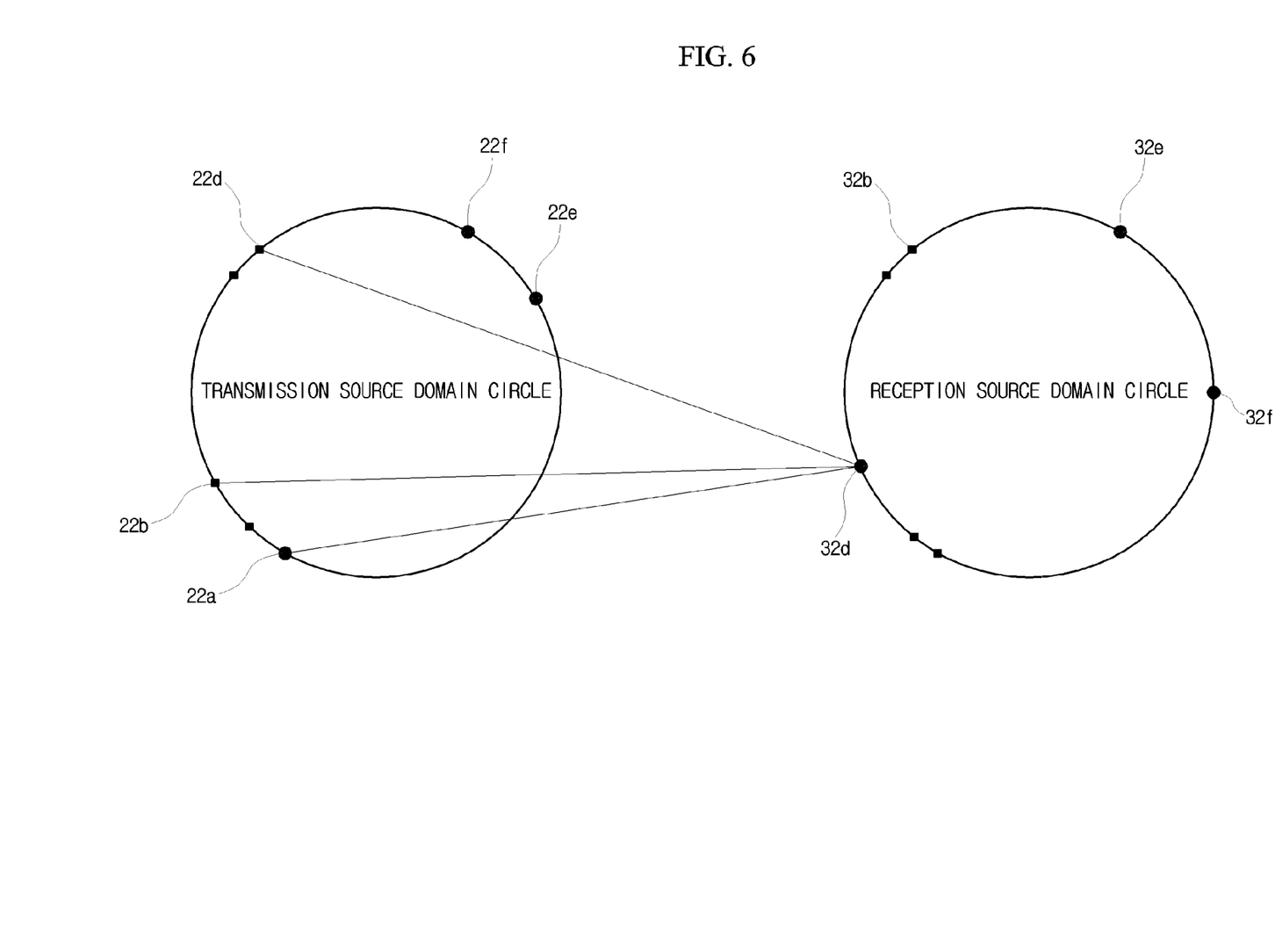
FIG. 6 is a diagram for describing a method of displaying a session between a transmission source domain circle and a reception source domain circle when a transmission source network sphere and a reception source network sphere are arranged side by side according to another embodiment of the present invention.

FIG. 6 is a diagram for describing a method of displaying a session when a transmission source domain circle and a reception source domain circle are arranged side by side according to another embodiment of the present invention.

Unlike one embodiment, in another embodiment, the transmission source domain circle 22 and the reception source domain circle 32 generated by the domain circle generation unit 121 shown in FIG. 2 may be arranged side by side.

Each of the points 22a, 22b, 22d, 22e and 22f on the circumference of the transmission source domain circle 22 may represent each of the transmission node IP addresses, and each of the points 32b, 32d, 32e and 32f may represent each of the reception node IP addresses.

According to another embodiment of the present invention, the transmission node 22a corresponding to one point of the transmission source domain circle 22 and the reception node 32d on the reception source domain circle 32 may be displayed to be connected.

The transmission node 22b corresponding to another point of the transmission source domain circle 22 may be displayed to be connected to the reception node 32*d*, and the transmission node 22*d* may be displayed to be connected to the reception node 32*d*.

Figure 7:
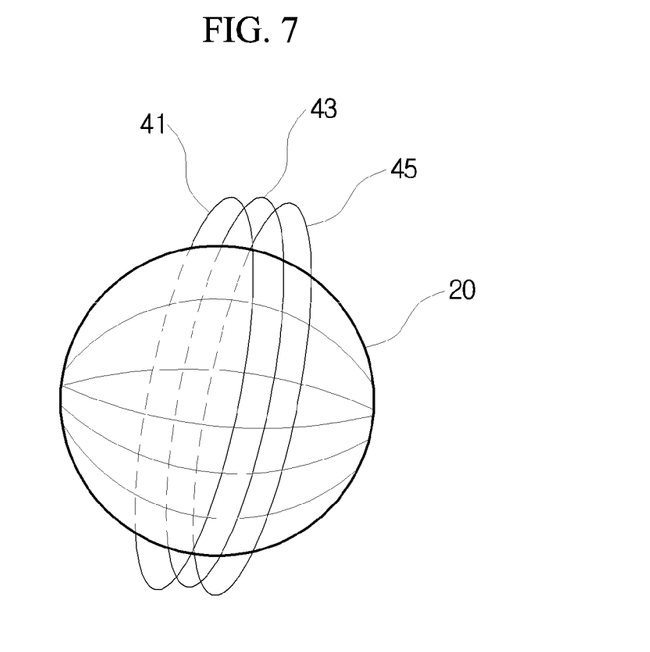
FIG. 7 is a diagram illustrating an example in which a protocol circle is arranged in a network sphere according to still another embodiment of the present invention.

FIG. 7 is a diagram illustrating an example in which a protocol circle is arranged in a network sphere according to still another embodiment of the present invention.

Referring to FIG. 7, in still another embodiment of the present invention, three transmission source protocol circles 41, 43 and 45 may be arranged in a shape of surrounding the transmission source network sphere 20.

For example, when the transmission nodes which the user desires to monitor construct a session with corresponding reception nodes using the TCP, UDP, and ICMP, one transmission source protocol circle 41 representing the TCP, one transmission source protocol circle 43 representing the UDP, and one transmission source protocol circle 45 representing the ICMP may be arranged in a shape of surrounding the transmission source network sphere 20. Three transmission source protocol circles may be constructed to be displayed in different colors in order to classify the three transmission source protocol circles visually.

Figure 8:
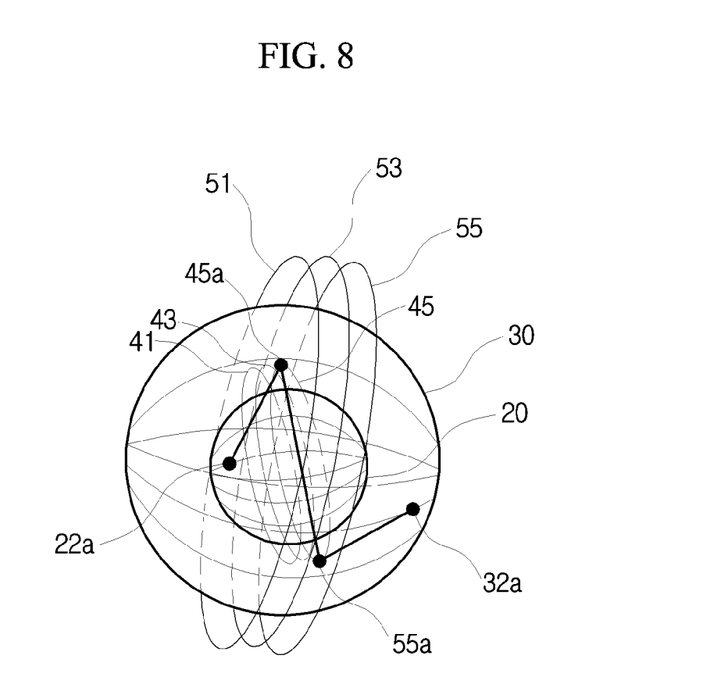
FIG. 8 is a diagram for describing a method of displaying a session when a transmission source network sphere is arranged in a reception source network sphere according to still another embodiment of the present invention.

FIG. 8 is a diagram for describing a method of displaying a session using a protocol circle when a transmission source network sphere is arranged in a reception source network sphere according to still another embodiment of the present invention.

The transmission source network sphere 20 generated by the network sphere generation unit 123 shown in FIG. 2 may be arranged in the reception source network sphere 30. At this time, the transmission source network sphere 20 and the transmission source protocol circles 41, 43 and 45 surrounding the transmission source network sphere 20 may be arranged in the reception source network sphere. The reception source protocol circles 51, 53 and 55 may surround the reception source network sphere 30.

According to still another embodiment of the present invention, when constructing a session between the transmission node 22*a* and the reception node 32*a* communicating with each other using the ICMP, the transmission node 22*a* may be connected to a port 45*a* mapped to the transmission source protocol circle 45 representing the ICMP. The port 45*a* may be connected to a port 55*a* mapped to the reception source protocol circle 55 representing the ICMP. The port 55*a* may be connected to the reception node 32*a* represented on the reception network. Accordingly, the session between the transmission node and the reception node may be constructed visually.

Figure 9:
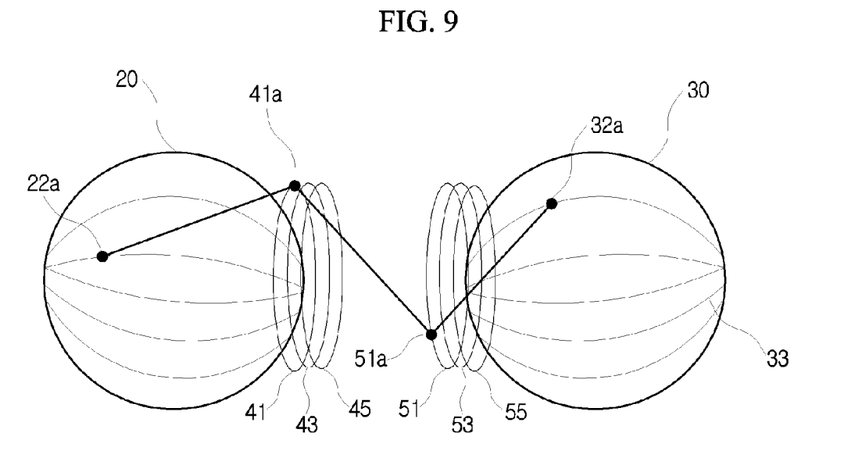
FIG. 9 is a diagram for describing a method of displaying a session when a transmission source network sphere and a reception source network sphere are arranged side by side according to yet another embodiment of the present invention.

FIG. 9 is a diagram for describing a method of displaying a session when a transmission source network sphere and a reception source network sphere are arranged side by side according to yet another embodiment of the present invention.

Referring to FIG. 9, in yet another embodiment of the present invention, the transmission source network sphere 20 and the reception source network sphere 30 generated by the network sphere generation unit 123 shown in FIG. 2 may be arranged side by side unlike still another embodiment of the present invention in which the transmission source network sphere is arranged in the reception source network sphere.

The plurality of transmission source protocol circles 41, 43, and 45 and the plurality of reception source protocol circles 51, 53, and 55 may be arranged between the transmission source network sphere 20 and the reception source network sphere 30 shown in FIG. 9.

According to yet another embodiment of the present invention, when constructing the session between the transmission node 22*a* and the reception node 32*a* communicating with each other using the TCP, the transmission node 22*a* may be connected to a port 41*a* mapped to the transmission source protocol circle 41 representing the TCP. The port 41*a* may be connected to a port 51*a* mapped to the reception source protocol circle 51 representing the TCP. The port 51*a* may be connected to the reception node 32*a* displayed on the reception network. Accordingly, the session between the transmission node and the reception node may be constructed visually.

As described above, the present invention may provide the apparatus for displaying the network security situation capable of monitoring the traffic events of the single domain and the multi domain intuitively by visualizing one domain as one circle and visualizing the network area as a sphere shape. Further, the present invention can allow the user to recognize the protocol and the port number of the session by arranging and displaying the protocol between the transmission node and the reception node.

Figure 10:
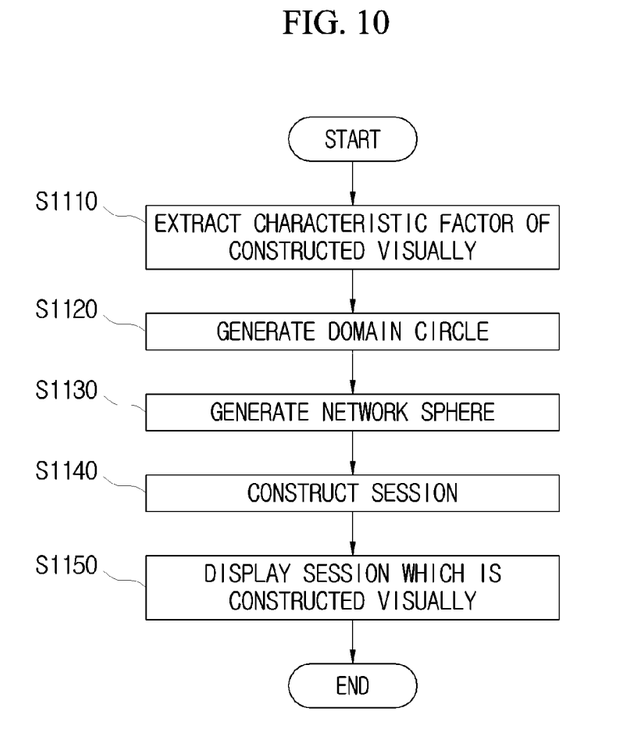
FIG. 10 is a flowchart for describing a method of displaying a network security situation according to an embodiment of the present invention.

FIG. 10 is a flowchart for describing a method of displaying a network security situation according to an embodiment of the present invention.

Extracting the characteristic factor of the security event may be performed in the extraction unit 110 (S1110). In the extraction unit 110, the characteristic factor including the IP address of the transmission node, the transmission protocol, the transmission port number, the IP address of the reception node, the reception protocol, and the reception port number from the traffic flow may be extracted.

Generating the domain circle may be performed in the network visualization unit 120 (S1120). Generating the plurality of transmission source protocol circles and the plurality of reception source protocol circles may be performed in the protocol circle generation unit 122.

Generating the network sphere may be performed in the network sphere generation unit 123 (S1130).

After this, constructing the session between the transmission node and the reception node visually may be performed in the session construction unit 130 (S1140).

Displaying the session which is represented visually may be performed in the display unit 140 (S1150).

The description described above with reference to FIGS. 1 to 9 may be applied to FIG. 10. Duplicate description will be omitted.

As described above, the present invention provides the apparatus and method of displaying the network security situation capable of monitoring the traffic events of the single domain and the multi domain intuitively by visualizing one domain as one circle and visualizing the network area as the sphere shape. Further, the embodiments of the present invention can allow the user to recognize the protocol and the port number of the session intuitively by connecting and displaying the transmission node and the reception node directly, or arranging and displaying the protocol between the transmission node and the reception node.

According to the present invention, the domain circle may be generated by mapping the IP address of the node to one point on the circumference, the sphere representing the network area may be formed using the generated domain circle, and the security events in the network area may be visualized. As a result, the network security situation can be recognized quickly and intuitively by monitoring every IP domain address space. Further, even when the plurality of sessions between the transmission node and the reception node are displayed, the session using a corresponding port can be easily recognized.

Further, convenience of security event management can be improved by selecting the domain in which the user desires to monitor according to the construction of the network area, and displaying the traffic events generated in the domain in which the user desires to monitor.

Moreover, the security situation of each apparatus and each session in the domain can be monitored intuitively by visualizing the traffic events of the single domain and the multi domain using the present invention.

It will be apparent to those skilled in the art that various modifications can be made to the above-described exemplary embodiments of the present invention without departing from the spirit or scope of the invention. Therefore, the above-described exemplary embodiments of the present invention are illustrative, and are not limited thereto. Thus, it is intended that the present invention covers all such modifications provided they come within the scope of the appended claims and their equivalents.

What is claimed is:

1. An apparatus for displaying a network security situation, comprising:
    an extraction unit configured to classify a characteristic factor including a plurality of transmission node addresses, a plurality of reception node addresses, a plurality of protocols and a plurality of port numbers according to each of a plurality of domains;
    a network visualization unit configured to generate a plurality of transmission source domain circles and a plurality of reception source domain circles representative of traffic events in the network by mapping corresponding node addresses on a circumference of one circle representing each of the plurality of domains, and generate a transmission source network sphere and a reception source network sphere visualized as a sphere shape by arranging the plurality of transmission source domain circles and the plurality of reception source domain circles which are generated on one axis;
    a session construction unit configured to construct a session between a transmission node address on the transmission source network sphere and a reception node address on the reception source network sphere visually; and
    a display unit configured to display a real time visualization of the session which is constructed visually,
    wherein the network visualization unit generates a plurality of transmission source protocol circles surrounding the transmission source network sphere and a plurality of reception source protocol circles surrounding the reception source network sphere by mapping the plurality of port numbers on the circumference of one circle representing each of the plurality of protocols and arranges the transmission source network sphere and the transmission source protocol circles surrounding the transmission source network sphere in the reception source network sphere.

2. The apparatus for displaying the network security situation of claim 1, wherein the session construction unit constructs the session visually by changing sizes of points on a circumference to which a corresponding node address is mapped or colors of connection lines connecting the points according to the number of sessions.

3. A method of displaying a network security situation, comprising:
    classifying a characteristic factor including a plurality of transmission node addresses, a plurality of reception node addresses, a plurality of protocols and a plurality of port numbers according to each of a plurality of domains;
    generating a plurality of transmission source domain circles and a plurality of reception source domain circles representative of traffic events in the network by mapping corresponding node addresses on a circumference of one circle representing each of the plurality of domains;
    generating a transmission source network sphere and a reception source network sphere visualized as a sphere shape by arranging the plurality of transmission source domain circles and the plurality of reception source domain circles which are generated on one axis;
    constructing a session between a transmission node address on the transmission source network sphere and a reception node address on the reception source network sphere visually; and
    displaying a real time visualization of the session which is constructed visually,
    wherein the generating of the domain circle generates a plurality of transmission source protocol circles and a plurality of reception source protocol circles by mapping the plurality of port numbers on the circumference of one circle representing each of the plurality of protocols, and
    wherein the generating of the transmission source network sphere and the reception source network sphere arranges the transmission source network sphere and the transmission source protocol circles surrounding the transmission source network sphere in the reception source network sphere.

4. The method of displaying the network security situation of claim 3, wherein the constructing of the session which is constructed visually comprises:
    receiving at least one of a transmission source domain and a reception source domain from the user; and
    constructing the session generated in the at least one of the transmission source domain and the reception source domain which is received visually.

5. The method of displaying the network security situation of claim 3, wherein the generating of the domain circle arranges the visualized transmission source domain circle in the reception source domain circle.

* * * * *